April 11, 1967

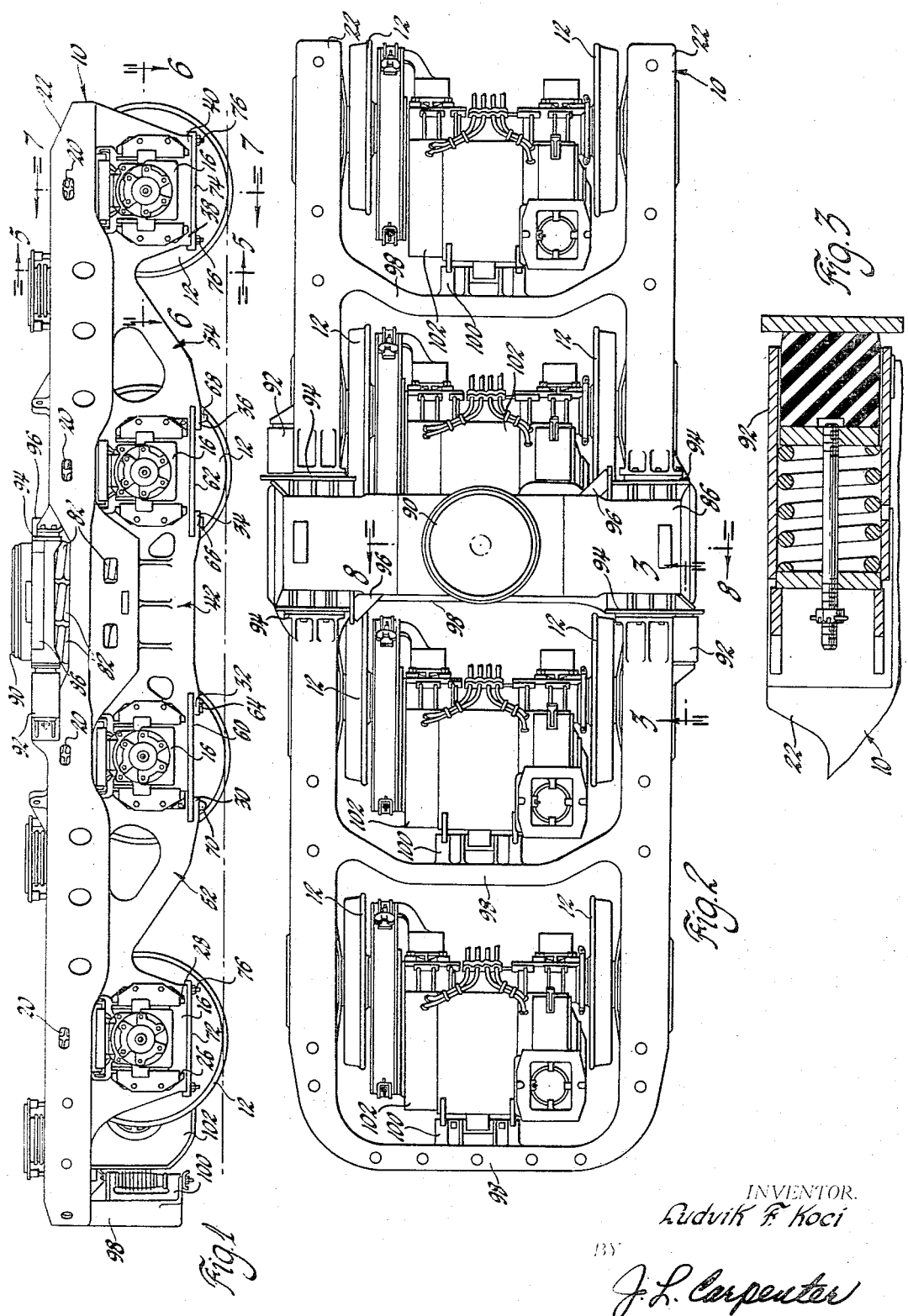

L. F. KOCI 3,313,244

RAILWAY VEHICLE TRUCK

Filed May 15, 1964

INVENTOR.
Ludvik F. Koci
BY
J. L. Carpenter
ATTORNEY

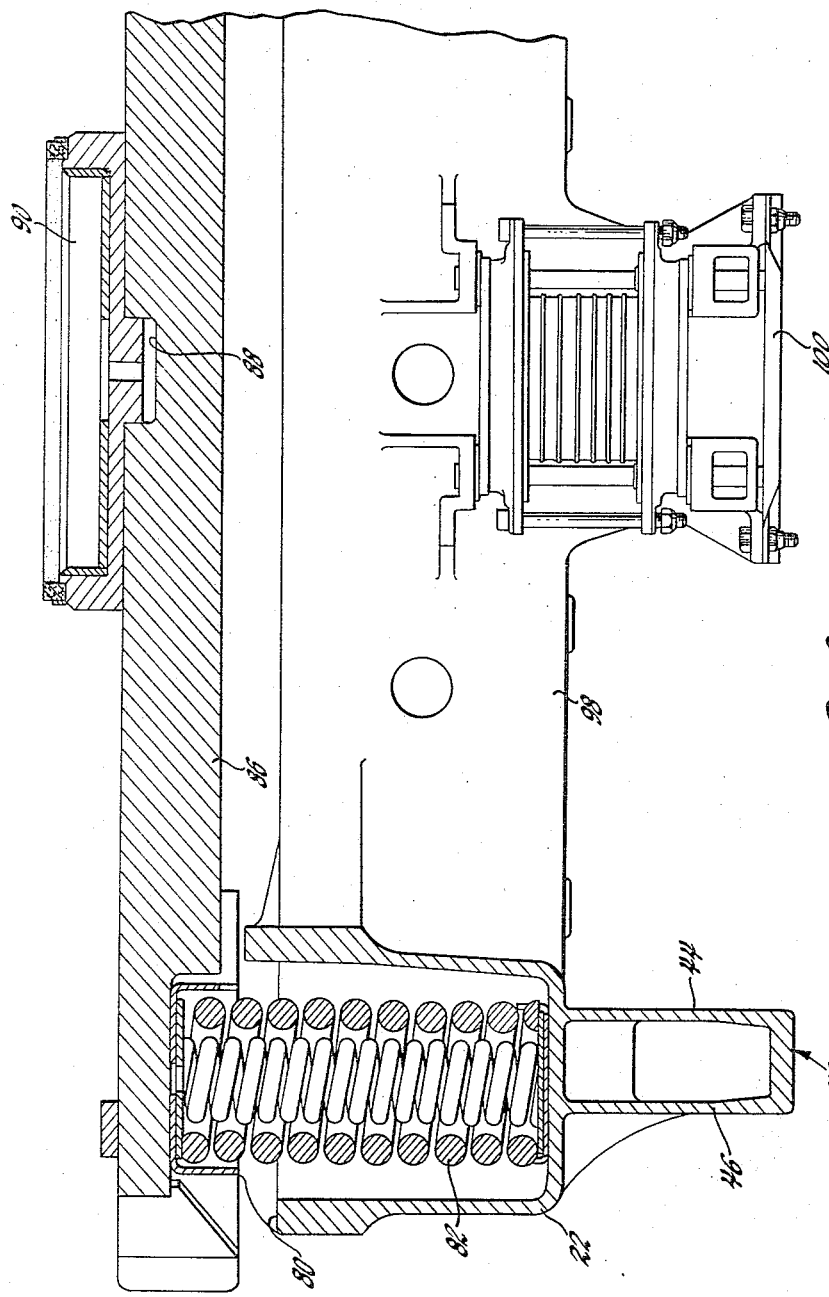

United States Patent Office 3,313,244
Patented Apr. 11, 1967

3,313,244
RAILWAY VEHICLE TRUCK
Ludvik F. Koci, Downers Grove, Ill., assignor to General Motors Corporation, Detroit, Mich., a corporation of Delaware
Filed May 15, 1964, Ser. No. 367,671
3 Claims. (Cl. 105—172)

This invention relates to a railway vehicle truck and specifically to a 4-axle railway vehicle truck having a cast integral frame.

Locomotives have recently been introduced into which are combined units which were previously available only in two or more locomotives. While this has increased the horsepower available in one vehicle and thus decreased the cost of railroad operation, it has greatly increased the weight of the locomotive. This increase in weight has been great enough in some instances to require doubling the number of wheel and axle sets supporting the locomotive.

It has been proposed to increase the number of wheel and axle sets by combining two standard 2-axle trucks with a span bolster. However, the span bolster in itself adds a considerable amount of expensive material to the locomotive. In addition, a span bolster raises the center of gravity of the locomotive, thus reducing its stability.

This invention provides a 4-axle truck having a cast integral frame, the weight of which is less than three-fourths of the weight of two standard 2-axle truck frames combined with a span bolster.

This invention further provides a 4-axle truck having a cast integral frame which is strengthened by tension bars secured across the central pairs of pedestals. The tension bars carry a relatively substantial portion of the tensile stresses in the truck frame and prevent failure in the side frames over the central pairs of journal boxes. The tension bars are secured to the frame so they may be swung out of position to remove the wheel and axle sets; yet they are retained so it is improbable that they will not be secured in position after replacing the wheel and axle sets.

This invention also provides a 4-axle truck having a cast integral frame in which the frame and the bolster are so designed that all components associated with the bolster engage it in a manner which creates relatively smaller stress concentrations than previous frame and bolster designs.

The details as well as other objects and advantages of this invention are discussed in the remaining portion of the specification and in the drawings in which:

FIGURE 1 is a side elevational view of the 4-axle truck provided by this invention;

FIGURE 2 is a top plan view of the 4-axle truck provided by this invention;

FIGURE 3 is a sectional view taken along line 3—3 of FIGURE 2;

FIGURE 8 is a sectional view taken along line 8—8 of FIGURE 2.

Figure 7:
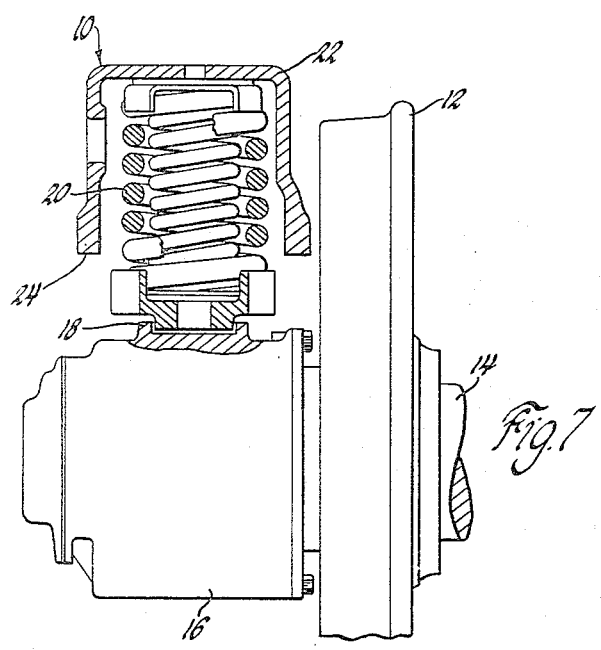
FIGURE 7 is a sectional view taken along line 7—7 of FIGURE 1.

Referring to FIGURES 1 and 2, a railway vehicle truck frame, shown generally at 10, is supported on sets of wheels 12 and axles 14. As shown in FIGURE 7, axles 14 are journaled in journal boxes 16 having upwardly facing supporting surfaces 18. Seated on surfaces 18 of journal boxes 16 are helical frame-supporting springs 20.

Figure 5:
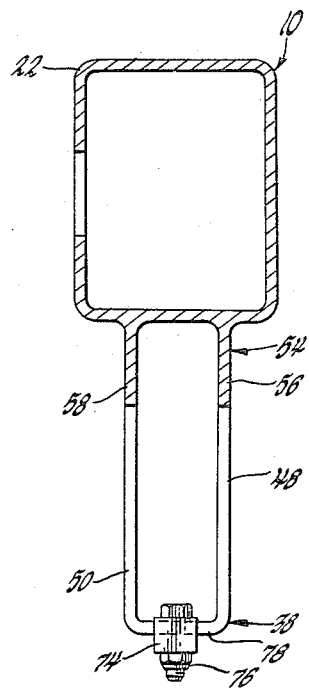
FIGURE 5 is a sectional view taken along line 5—5 of FIGURE 1.

Frame 10 has two longitudinally extending, transversely spaced side members 22 of a hollow, generally rectangular cross section (see FIGURE 5). At four portions, spaced longitudinally over journal boxes 16, side members 22 are open, as shown at 24 in FIGURE 7, to form a downwardly facing channel member within which frame-supporting springs 20 are received.

Figure 6:
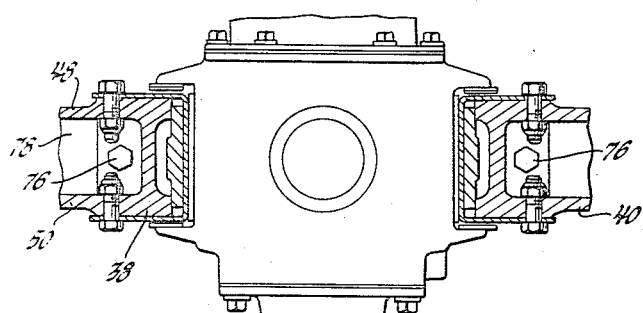
FIGURE 6 is a sectional view taken along line 6—6 of FIGURE 1.

Eight pedestals 26, 28, 30, 32, 34, 36, 38 and 40 (see FIGURES 1, 5, and 6) depend from each of side members 22 and are grouped into four pairs of pedestals, each of which embraces a journal box 16.

For strengthening purposes, a central web 42 (see FIGURES 1 and 8) depends from each side member 22 and extends longitudinally between pedestals 32 and 34. The side portions 44 and 46 of web 42 are connected with the side portions of pedestals 32 and 34 which are similar to the side portions 48 and 50 of pedestal 38 shown in FIGURES 5 and 6.

For further strengthening of frame 10, reinforcing webs 52 and 54 (see FIGURES 1 and 5) depend from each side member 22 and extend longitudinally and upwardly from pedestal 30 to pedestal 28 and from pedestal 36 to pedestal 38. The side portions 56 and 58 of web 54 are connected with the side portions 48 and 50 of pedestal 38 and with similar side portions of pedestal 36, and similar side portions of web 52 are connected to similar side portions of pedestals 28 and 30.

Figure 4:
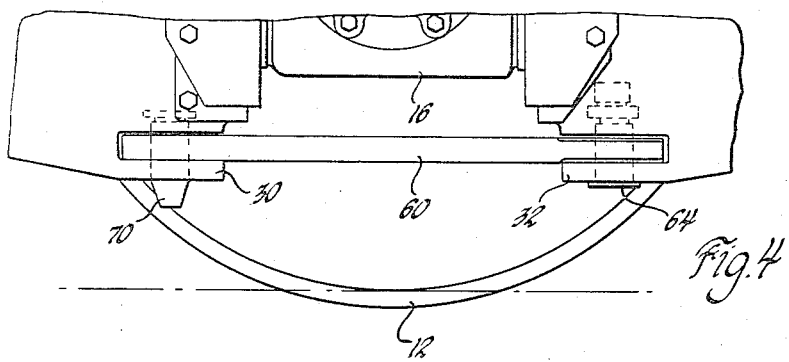
FIGURE 4 is an enlarged view of one of the tension bars and its securing pins shown in FIGURE 1.

It will be appreciated that the integral webs and pedestals depending from the side members lend substantial bending strength to the side frames. However, a relatively weak portion remains over the journal boxes. Therefore, to reinforce frame 10 still further, tension bars 60 and 62 (see FIGURES 1 and 4) are secured to and extend between the base portions of pedestals 30 and 32 and of pedestals 34 and 36.

Tension bars 60 and 62 are pivotally secured at one end to pedestals 32 and 34 by securing pins 64 and 66. Securing pins 64 and 66 are formed and connected to tension bars 60 and 62 and pedestals 32 and 34 in such a manner that they may not be removed.

Tension bars 60 and 62 are secured to pedestals 30 and 36 and retained against pivotal movement about pins 64 and 66 by removable pins 68 and 70.

Tension bars 60 and 62, extending between web 52 and web 42 and between web 42 and web 54, provide a path through the webs and the tension bars to substantially reduce the tensile stress concentrations induced within each side member 22 by bending loads.

Tension bars 60 and 62 also act as pedestal straps to prevent the central pair of wheel and axle sets from dropping out of the intermediate pairs of pedestals should a derailment occur.

Inasmuch as fasteners 68 and 70 are removable, tension bars 60 and 62 may be pivoted should it be necessary to change out the central pairs of wheel and axle sets. Further, inasmuch as pins 64 and 66 are not removable, it is highly unlikely that repair personnel will neglect to replace tension bars 60 and 62. It should be realized that, should tension bars 60 and 62 fail to be secured in proper position, the tensile stress concentrations in side members 22 over the central pair of wheel and axle sets could be great enough to cause failure of side members 22.

A pair of pedestal straps 72 and 74 are secured, by means such as bolts 76, to the base portions, such as 78 (see FIGURES 5 and 6), of pedestals 26, 28, 38 and 40. While pedestal straps 72 and 74 do not tend to reduce the tensile stress concentrations within side members 22 to any considerable extent, they do prevent the end sets of wheels and axles from dropping out should a derailment occur.

The central portion of each of side members 22, over web 42, is open, as shown at 80 in FIGURE 8, to form an upwardly facing channel within which bolster-supporting springs 82 may be received.

A bolster 86 is entirely supported by springs 82. Bolster 86 has a central recess 88 within which a center bearing member 90 is received to support the locomotive car-body on the truck. Such a combination of center bearing member and bolster eliminates the necessity of welding the center bearing member to the high strength steel bolster in the central, highly stressed area and thus avoids the reduction of strength in the bolster consequent upon welding.

Snubbers 92 (see FIGURES 1, 2 and 3) are secured to opposite sides of frame 10 and abut opposite sides of bolster 86 to damp the movement of springs 82 which support bolster 86.

Wear plates 94 are secured to each side member 22 on opposite sides of bolster 86 to reduce the chafing between bolster 86 and side members 22.

Limit stops 96 are secured to opposite sides of bolster 86 to strike side members 22 and check excess lateral movement of bolster 86 relative to frame 10.

It will be noticed all of the components affecting interaction between frame 10 and bolster 86—bolster-supporting springs 82, bolster-movement snubbers 92, chafing reducing wear plates 94, and bolster-movement limit stops 96—engage bolster 86 at its outboard ends where the internal stress concentrations are lowest.

Side members 22 of frame 10 are connected by transversely extending, longitudinally spaced transom members 98. Supports 100 (see FIGURES 1, 2 and 8) are provided on transom members 98 for resiliently mounting the traction motors 102 from which the wheels 12 and axles 14 are driven.

I claim:

1. A cast integral frame for a railway vehicle 4-axle truck comprising a pair of longitudinally extending transversely spaced side members, said side members being interconnected by four transversely extending longitudinally spaced transom members, each of said side members having a hollow generally rectangular section, each of said side members having portions removed at four longitudinally spaced intervals to form downwardly facing channel portions in which helical frame-supporting springs may be received, each of said side members having eight pedestals depending therefrom, each of said pedestals having a hollow generally rectangular section with side portions and a base portion, said pedestals being grouped into four longitudinally spaced pairs of pedestals, each of said pairs being adapted to embrace an axle journal box, each of said side members having a strengthening web depending therefrom and extending longitudinally between the fourth and fifth of said pedestals which form adjacent pedestals of the second and third of said pairs of pedestals, said web having a hollow generally rectangular section with side portions, said side portions of said web and of said fourth and fifth pedestals being connected, each of said side members having reinforcing webs depending therefrom and extending longitudinally upwardly from the third of said pedestals to the second of said pedestals which form adjacent pedestals of the first and second of said pairs of pedestals and from the sixth of said pedestals to the seventh of said pedestals which form adjacent pedestals of the third and fourth of said pairs of pedestals, said reinforcing webs having downwardly facing channel sections with side portions, said side portions of said reinforcing webs and of the associated pedestals being connected, each of said side members having a portion removed to form an upwardly facing channel portion within which helical bolster-supporting springs may be received, said base portions of said third, fourth, fifth and sixth pedestals each having an opening extending therethrough, each opening being adapted to receive means for retaining a tension member between said third and fourth and between said fifth and sixth pedestals.

2. In a railway vehicle truck, four longitudinally spaced axles to which wheels are attached; journal boxes on the ends of said axles having upwardly facing supporting surfaces; helical springs seated on said supporting surfaces; a cast integral truck frame supported on said springs comprising a pair of longitudinally extending transversely spaced side members located vertically over said journal boxes, four transversely extending longitudinally spaced transom members interconnecting said side members, each of said side members having a hollow generally rectangular section, each of said side members having portions removed at four longitudinally spaced portions located vertically of said journal boxes to form downwardly facing channel portions within which said springs are received, eight pedestals depending from each of said side members, each of said pedestals having a hollow generally rectangular section with side portions and a base portion, said pedestals being grouped into four longitudinally spaced pairs of pedestals, each of said pairs of pedestals embracing one of said journal boxes, a strengthening web depending from each of said side members and extending longitudinally between the fourth and fifth of said pedestals which form adjacent pedestals of the second and third of said pairs of pedestals, said web having a hollow generally rectangular section with side portions, said side portions of said web and of said fourth and fifth pedestals being connected, and reinforcing webs depending from each of said side members and extending longitudinally upwardly from the third of said pedestals to the second of said pedestals which form adjacent pedestals of the first and second of said pairs of pedestals and from the sixth of said pedestals to the seventh of said pedestals which form adjacent pedestals of the third and fourth of said pairs of pedestals, said reinforcing webs having downwardly facing channel sections with side portions, said side portions of said reinforcing webs and of the associated pedestals being connected, said base portions of said pedestals each having a vertical opening extending therethrough within which securing means may be received, each of said side members having a portion removed to form an upwardly facing channel portion within which bolster-supporting springs may be seated; helical bolster-supporting springs seated in said upwardly facing channel portions of said side members; a transversely extending bolster supported on said bolster-supporting springs; a center bearing member centrally located on said bolster; a first tension bar secured to and extending between said third and fourth pedestals beneath the journal box embraced by said second pair of pedestals, a second tension bar secured to and extending between said fifth and sixth pedestals beneath the journal box embraced by said third pair of pedestals, said tension bars adding strength to said frame and retaining said journal boxes within said second and third pairs of pedestals; non-removable securing means extending through said openings in one of said third and fourth pedestals and in one of said fifth and sixth pedestals securing said first tension bar to said one of said third and fourth pedestals for horizontal pivotal movement and securing said second tension bar to said one of said fifth and sixth pedestals for horizontal pivotal movement, removable securing means extending through said openings in the other of said third and fourth pedestals and in the other of said fifth and sixth pedestals retaining said tension bars against pivotal movement and securing said first tension bar to said other of said third and fourth pedestals and securing said second tension bar to said other of said fifth and sixth pedestals; a first pedestal strap secured to and extending between the first of said pedestals and said second pedestal, a second pedestal strap secured to and extending between said seventh pedestal and the eighth of said pedestals, said pedestal straps retaining said journal boxes within said first and fourth pairs of pedestals; and securing means extending through said openings in said first, second, seventh, and eighth pedestals securing said first pedestal strap to said first and second pedestals and securing said second pedestal strap to said seventh and eighth pedestals.

3. The combination of claim 2 wherein said bolster has an upwardly facing recess centrally located therein and said center bearing member is received and retained in said recess without welding.

References Cited by the Examiner

UNITED STATES PATENTS

| | | | |
|---|---|---|---|
| Re. 22,867 | 4/1947 | Dath | 105—197 |
| 661,432 | 11/1900 | VanDorn | 105—196 |
| 713,510 | 11/1902 | Shallenberger | 105—206 |
| 1,174,272 | 3/1916 | Pflager | 105—172 |
| 1,347,887 | 7/1920 | Barber | 105—196 |
| 1,410,596 | 3/1922 | Pray | 105—172 |
| 2,233,541 | 3/1941 | Latshaw | 105—183 |
| 2,365,406 | 12/1944 | Gilchrist et al. | 105—183 |
| 2,898,869 | 8/1959 | Zach | 105—193 X |

ARTHUR L. LA POINT, *Primary Examiner.*

H. BELTRAN, *Assistant Examiner.*